United States Patent

[11] 3,594,555

| [72] | Inventors | Hans-Christof Klein<br>Hattersheim;<br>Gunther Werner, Oberstedten, both of, Germany |
|---|---|---|
| [21] | Appl. No. | 760,894 |
| [22] | Filed | Sept. 19, 1968 |
| [45] | Patented | July 20, 1971 |
| [73] | Assignee | Alfred Teves GmbH<br>Frankfurt am Main, Germany |
| [32] | Priority | Sept. 26, 1967 |
| [33] | | Germany |
| [31] | | T 34884 |

[54] METHOD OF AND APPARATUS FOR MEASURING ANGULAR ACCELERATION
6 Claims, 3 Drawing Figs.

[52] U.S. Cl. ............................................. 235/150.24,
73/517 A, 303/21 BE, 303/21 CF, 324/162, 324/166
[51] Int. Cl. ...................................................... G06g 7/78, B60t 8/08
[50] Field of Search........................................... 235/150.2, 150.24; 324/70 A, 70 G, 70 C, 70; 303/21 BE, 21 BB, 21 EB, 21 CF; 73/514, 517 A

[56] References Cited
UNITED STATES PATENTS

| 2,306,360 | 12/1942 | Stuart, Jr. ..................... | 324/70 |
| 2,942,184 | 6/1960 | Sihvonen et al. ............. | 324/70 |
| 3,032,715 | 5/1962 | Frye ............................. | 324/70 |
| 3,103,628 | 10/1963 | Takaya......................... | 324/70 |
| 3,245,727 | 4/1966 | Anderson et al............. | 303/21 |

OTHER REFERENCES

Korn & Korn: ELECTRONIC ANALOG COMPUTERS, Second Edition, 1956, page 13 (only)

*Primary Examiner*—Malcolm A. Morrison
*Assistant Examiner*—Felix D. Gruber
*Attorney*—Karl F. Ross ABSTRACT: In order to measure angular acceleration, two sine wave signals $U_1$ and $U_2$ of a frequency determined by the angular velocity are generated by a rotating body, preferably a vehicle wheel. These signals $U_1$ and $U_2$, and their time derivatives are combined to produce an output corresponding to the second time derivative of angular displacement $\varphi(t)$ (i.e. angular acceleration) in accordance with the relationship:

$$\ddot{U}_2 \cdot U_1 - \ddot{U}_1 \cdot U_2 = m^2 \ddot{\varphi}(t) \; (m^2 = U_1^2 + U_2^2).$$

The output controls an antiskid system for the brake.

PATENTED JUL 20 1971 3,594,555

Hans-Christof Klein
Günther Werner
INVENTORS.

BY Karl F. Ross
Attorney

METHOD OF AND APPARATUS FOR MEASURING ANGULAR ACCELERATION

Our present invention relates to a method of and an apparatus for the measurement or computation of the angular acceleration of a rotating body and, more particularly, to such systems as are applied to the measurement of the angular acceleration of a vehicle wheel for controlling braking force and preventing locking of the wheels.

Due to the increasing size and speed of today's motor vehicles, and their increasing numbers, rendering traffic more dangerous daily, brake systems often are equipped with antiskid regulating arrangements. These arrangements regulate the braking force in relation to the angular acceleration or deceleration of the vehicle wheels to prevent the vehicle wheels from locking and, therefore, braking inefficiently or throwing the vehicle into a skid.

Such arrangements have heretofore depended upon accelerometers rotationally driven by or with the vehicle wheel. These accelerometers all contained some parts greatly liable to wear (brushes, sliprings or the like) which are also disadvantageous since they can become fouled thereby making the whole arrangement inoperative. In addition, these devices are often highly inaccurate due to near total reliance on mechanical measuring means.

It is an object of our invention to provide a method of accurately measuring or computing angular acceleration in a new and surprising way not dependent on wear- and dirt-sensitive devices connected to the vehicle wheel.

Another object of this invention is to provide an input representing angular acceleration which can be used to operate an antiskid system of the character described.

We do this, according to a feature of our invention, by rotatably driving a two-winding AC sine wave generator with the vehicle wheel to produce two out-of-phase (by 90°) sine wave signals whose frequencies are proportional to the angular velocity of the wheel. The invention makes use of the fact that 90° out-of-phase sine waves correspond to the sine and cosine functions of the same signal wave. To minimize wear as much as possible, this generator comprises two adjacent stator windings cooperating with two adjacent permanent magnets mounted on a single shaft at an angular offset of 90° with respect to the other. Thus only the shaft bearings which must be present in any event are liable to wear and fouling, a sizable advantage over the prior art devices.

A further feature of our invention is the provision of a logic circuit which, using the fact that the signals always have the same phase relationship but varying frequencies, computes the angular acceleration through use of the relationship: $\ddot{U}_1 \cdot U_2 - \ddot{U}_2 \cdot U_1 = m^2 \ddot{\varphi}(t)$ wherein $U_1$ is an amplitude of one signal, $U_2$ is the corresponding amplitude of the other and $\ddot{\varphi}(t)$ is the second derivative of angular displacement with respect to time and, therefore, the angular acceleration $\alpha$. $m^2 (= U_1^2 + U_2^2)$ is merely a constant dependent on the voltage, resistance, or current amplitudes in which the signals are evaluated.

The above object and features of our invention will be described in the following, with reference to the drawing in which.

Figure 1:
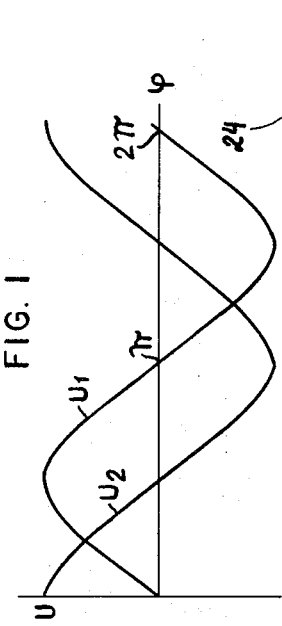
FIG. 1 is a graph showing the relationship between the sine wave signals according to our invention.
Figure 2:
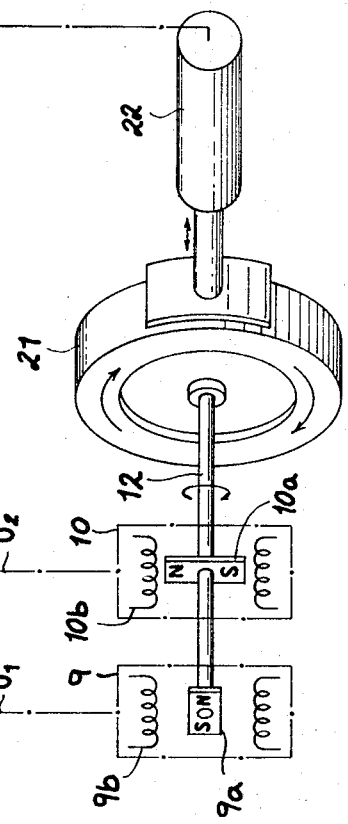
FIG. 2 is a schematic diagram of a vehicle braking-force regulating arrangement using the principles of this invention.

Another aspect of our invention resides in the novel way of generating a signal at the motor vehicle wheel. This is shown schematically in FIG. 4 where a motor vehicle wheel 21 is connected via a shaft 12 to two small AC generators 9 and 10. These AC generators 9 and 10 each have a respective permanent magnet 9a and 10a mounted on the shaft 12 with an angular offset of 90° between them and a respective stator winding 9b, and 10b.

The output of these generators 9 and 10 is fed into a logic circuit 1 which combines them according to principles described below and computes the angular acceleration $\alpha$ of the wheel 21. The output of the logic circuit 1 is fed into a valve arrangement 23 which controls the braking pressure in the brake line between a master cylinder 24 and a wheel brake 22. Thus braking is carried out as a function of the angular acceleration $\alpha$ of the wheel 21 to avoid locking of the wheel 21 and therefore inefficient braking.

FIG. 1 is a graph showing output signals $U_1$ and $U_2$ plotted along the ordinate in terms of an amplitude (e.g. voltage, current) against the angular displacement (plotted along the abscissa). As can be seen, the two sine wave signals $U_1$ and $U_2$ are 90° out of phase with one another. This known phase difference is the reference against which the angular acceleration $\alpha$ is measured.

Figure 3:
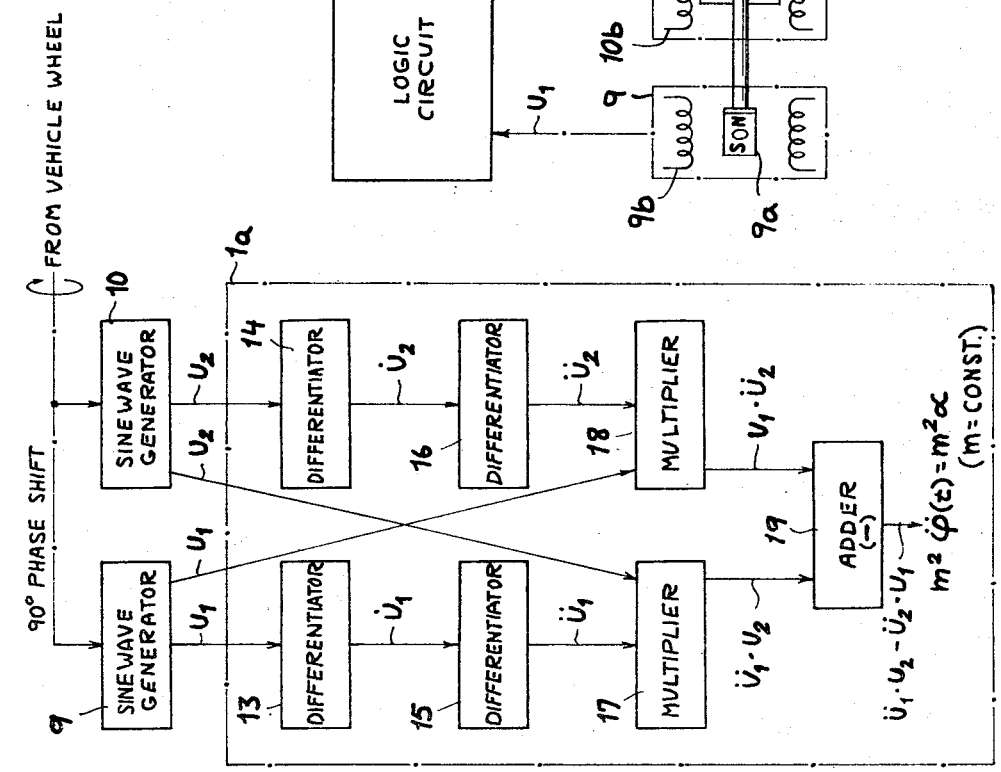
FIG. 3 is a block diagram showing a further embodiment of a logic circuit according to our invention.

A circuit 1a (FIG. 3) can be used. This circuit 1a also operates under the basic principle that the second time derivative of angular displacement is equal to angular acceleration. The logic circuit 1a makes use of the basic relationships:

$$U_1 = m \cdot \sin \varphi, \quad (1)$$

and $$U_2 = m \cdot \cos \varphi, \quad (2)$$

where $m$ is a proportionality constant determined by the characteristics of 9 and 10, i.e.

$$m^2 = U_1^2 + U_2^2 \quad (3)$$

Differentiating $U_1$ gives:

$$\dot{U}_1 = m \cdot \dot{\varphi}(t) \cdot \cos \varphi(t), \quad (4)$$

The signal $U_2 = m \cos \Phi$ (2) is differentiated twice obtaining the following second derivative relationship:

$$\ddot{U}_2 = -m \dot{\varphi}(t) \cdot \sin \varphi(t) - m \ddot{\varphi}(t) \cdot \cos \varphi(t) \quad (11)$$

Substituting in equation (11) the relations (1) and (4) gives:

$$\ddot{U}_2 = -U_1 \cdot \dot{\varphi}(t) - \dot{U}_1 \cdot (t) \quad (12)$$

From equations (2) and (4) it can be seen that $$U_2 = -U_1 \cdot \dot{\varphi}(t) \quad (13)$$

which can be differentiated twice to obtain:

$$\ddot{U}_2 = -U_1 \ddot{\varphi}(t) + \frac{\dot{U}_1 \cdot \dot{U}_2}{U_1} \quad (14)$$

Rationalizing the equation (14) gives:

$$\ddot{U}_2 \cdot U_1 = -U_1^2 \ddot{\varphi}(t) + \dot{U}_1 \cdot \dot{U}_2 \quad (15)$$

which is closely parallel to the product of equation (14) and $U_1$:

$$\ddot{U}_1 \cdot U_2 = U_2^2 \ddot{\varphi}(t) + \dot{U}_1 \cdot \dot{U}_2 \quad (16)$$

From the sum of these equations (15) and (16) the following can be derived:

$$-U_1 \cdot \ddot{U}_2 + U_2 \cdot \ddot{U}_1 = \ddot{\varphi}(t) (U_1^2 + U_2^2) \quad (17)$$

Since $U_1^2 + U_2^2 = m^2$, relationship (17) can be written $$m^2 \ddot{\varphi}(t) = \ddot{U}_1 \cdot U_2 - U_1 \cdot \ddot{U}_2 \quad (18)$$

Wherein $m^2 \ddot{\varphi}(t)$ is proportional to the angular acceleration $\alpha$.

The logic circuit 1a carries out the above-described steps as follows:

The two signals $U_1$ and $U_2$ from the generators 9 and 10 are each differentiated twice in differentiators 13, 15 and 14, 16 respectively. These second time derivatives $\ddot{U}_1$ and $\ddot{U}_2$ are fed into multipliers 17 and 18 to produce the respective product signals $\ddot{U}_1 \cdot U_2$ and $U_1 \cdot \ddot{U}_2$. An adder 19 subtracts the latter of these two products from the former and yields a signal equal to the equation (19) and, therefore, proportional to the angular acceleration.

Although our invention has been shown with particular reference to a motor vehicle brake system, it can be equally used in any system requiring means for accurately measuring angular acceleration. Furthermore, while the use of AC voltage generators 9 and 10 in the system is desirable, generators producing a sine wave resistance or current signal are also usable.

The improvement described and illustrated is believed to admit of many modifications within the ability of persons skilled in the art, all such modifications being considered within the spirit and scope of the invention except as limited by the appended claims.

We claim:

1. A method of operating an acceleration-responsive device in accordance with the angular acceleration of a rotating body, comprising the steps of generating two sinusoidal signals $U_1$ and $U_2$ of a frequency proportional to the angular velocity of said body and 90° out-of-phase relationship; deriving from the out-of-phase signals $U_1$ and $U_2$, second time derivatives $\ddot{U}_1$ and $\ddot{U}_2$, respectively; and combining said signals to produce an output for operating said device and proportional to the angular acceleration of said body in accordance with the relationship $$m^2 \cdot \ddot{\varphi}(t) = \ddot{U}_1 \cdot U_2 - \ddot{U}_2 \cdot U_1$$

where $\ddot{\varphi}(t)$ is the angular acceleration and $m^2$ is a proportionality constant.

2. The method defined in claim 1 wherein said rotating body is a vehicle wheel and said device is an antiskid brake control system.

3. A system for operating an acceleration-responsive device in accordance with the angular acceleration of a rotating body, comprising signal generator means coupled with said body for producing two sinusoidal signals $U_1$ and $U_2$ of a frequency proportional to the angular velocity of said body and a 90° out-of-phase relationship with one another; differentiator means for generating further signals $\dot{U}_1$ and $\dot{U}_2$ corresponding to the first time derivatives of the out-of-phase signals, respectively; second differentiator means for producing second time derivatives $\ddot{U}_1$ and $\ddot{U}_2$ from the corresponding first time derivatives; and circuit means for combining said signals and said derivatives to produce an output proportional to the angular acceleration of said body and for operating said device in accordance with the relationship $$m^2 \ddot{\varphi}(t) = \ddot{U}_1 \cdot U_2 - \ddot{U}_2 \cdot U_1$$

where $\ddot{\varphi}(t)$ is the angular acceleration and $m$ is a proportionality constant.

4. The system defined in claim 3 wherein said signal generator means includes a pair of permanent magnet members rotatably connected with said body, and a pair of coil members respectively associated with said magnet members for the induction of the respective sinusoidal signal thereof, one of the associated magnet and coil members being angularly offset by 90° from the corresponding member of the other associated pair of magnet and coil members.

5. The system defined in claim 4 wherein said magnet members are polarized in 90° angularly offset relationship with one another.

6. The system defined in claim 3 wherein said device is an antiskid brake control system for an automotive vehicle.